United States Patent
Zambrano et al.

(10) Patent No.: US 6,636,842 B1
(45) Date of Patent: Oct. 21, 2003

(54) SYSTEM AND METHOD FOR CONTROLLING AN INDUSTRIAL PROCESS UTILIZING PROCESS TRAJECTORIES

(75) Inventors: Alexander Zambrano, Calle la Penta (VE); Manuel Vazquez, Chacao Caracas (VE); Hugo E. Aponte, Chacao Caracas (VE); Alexis A Suarez, Chacao Caracas (VE); Jose Fernandes, Caracas (VE)

(73) Assignee: Intevep, S.A., Caracas (VE)

(*) Notice: Subject to any disclaimer, the term of this patent is extended or adjusted under 35 U.S.C. 154(b) by 157 days.

(21) Appl. No.: 09/616,337

(22) Filed: Jul. 15, 2000

(51) Int. Cl.[7] .......................... G05B 13/02; G06E 1/00; G06E 3/00; G06F 15/18; G06G 7/00
(52) U.S. Cl. ..................... 706/23; 706/21; 706/46
(58) Field of Search .................... 706/23, 21, 46

(56) References Cited

U.S. PATENT DOCUMENTS

| 4,228,509 A | * 10/1980 | Kennedy ................ 208/133 |
| 4,358,822 A | 11/1982 | Sanchez ..................... 700/31 |
| 5,023,912 A | 6/1991 | Segawa ..................... 704/240 |
| 5,339,257 A | 8/1994 | Layden et al. .............. 702/84 |
| 5,373,486 A | * 12/1994 | Dowla et al. ................ 181/101 |
| 5,949,678 A | 9/1999 | Wold et al. |
| 6,286,363 B1 | * 9/2001 | Discenzo .................. 340/631 |
| 6,295,510 B1 | * 9/2001 | Discenzo .................... 310/50 |

FOREIGN PATENT DOCUMENTS

EP    0 952 501 A2    10/1999

OTHER PUBLICATIONS

An article entitled, "Kohonen and Counterpropagation Artificial Neural Networks, In Analytical Chemistry," By Zupan et al., published by Chemometrics and Intelligent Laboratory Systems, vol. 38, Feb. 27, 1997, pp. 1–23.

* cited by examiner

*Primary Examiner*—Ramesh Patel
*Assistant Examiner*—Joseph P. Hirl
(74) *Attorney, Agent, or Firm*—Bachman & LaPointe, P.C.

(57) ABSTRACT

A method for monitoring an industrial process, including the steps of: providing a knowledge base comprising a two-dimensional representation of operational conditions for the process; obtaining process real time data from the industrial process for a plurality of process variables; selecting relevant features from the real time data; obtaining an operational condition classification from the relevant features; transforming the operational condition classification into a point; and displaying the point on said knowledge base.

14 Claims, 1 Drawing Sheet

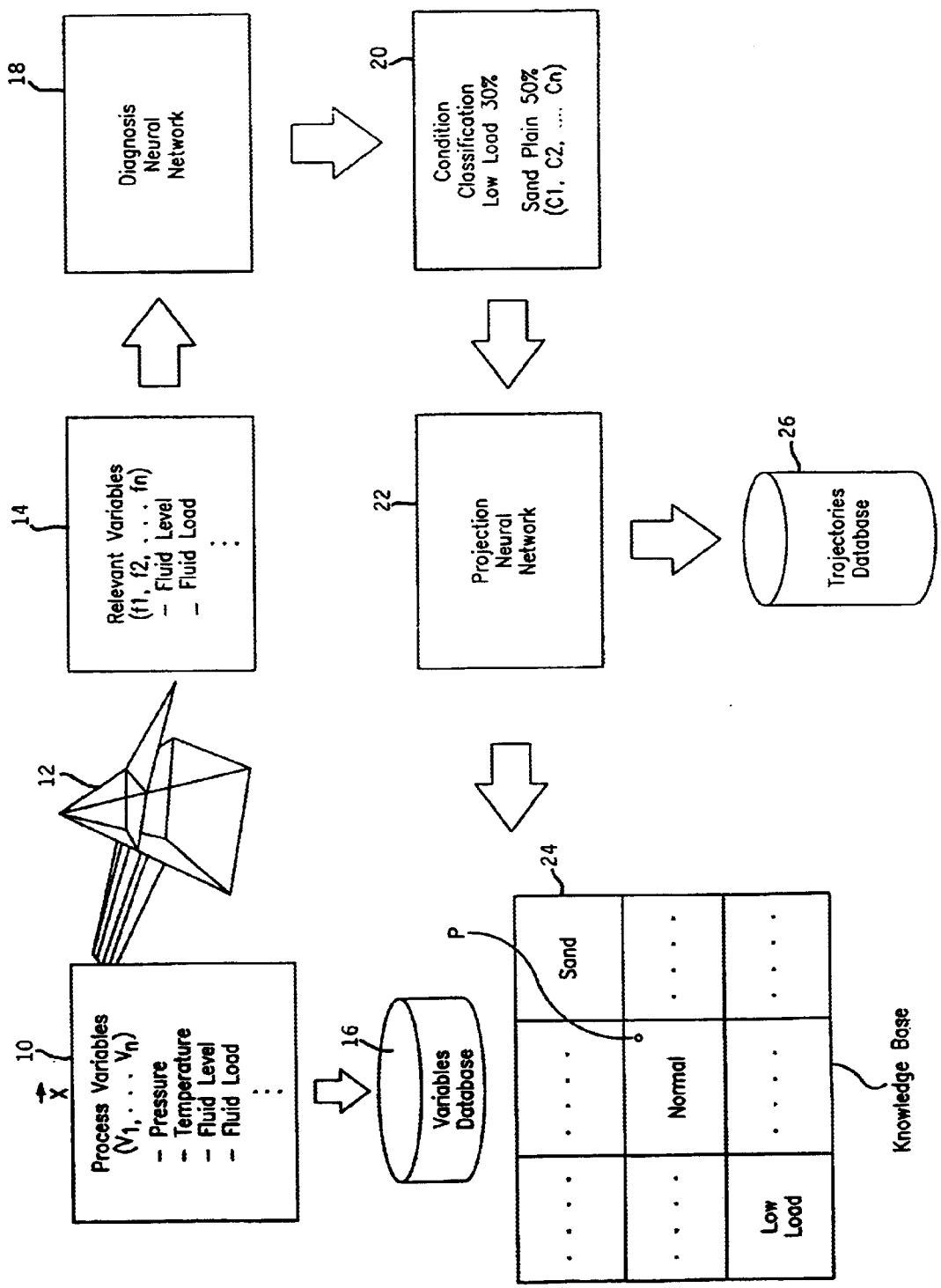

SYSTEM AND METHOD FOR CONTROLLING AN INDUSTRIAL PROCESS UTILIZING PROCESS TRAJECTORIES

BACKGROUND OF THE INVENTION

The invention relates to a system and method for controlling industrial processes and, more particularly, to a system and method for controlling, monitoring and optimizing processes by processing, transforming and interpreting the process variables.

Industrial processes such as processes within the oil and gas industry are typified by a large number of variables, many of which cannot readily be calculated or predicted using conventional mathematical relationships. A growing volume of available information for such processes has combined with growing complexity of business technology and a greater need for industrial security so as to safeguard personnel, installations and the environment, such that monitoring of multi-variable processes such as those within the oil and gas industry has become a highly complex task.

It is clear that the need exists for a system and method whereby the vast amount of information available regarding various industrial processes, which information contains potentially large numbers of different variables, can be accurately and effectively monitored so as to allow control and/or optimization of a single process or subprocess within the processes being monitored, on an as needed basis. It is therefore the primary object of the present invention to provide a system and method which transforms the multi-variable environment of such processes so as to allow focused attention by an operator on a particular process undergoing unexpected behavior.

It is a further object of the present invention to provide a system and method which allows for local and global optimization of process performance.

It is a still further object of the present invention to provide a system and method which allow for early detection of and reaction to abnormal process situations.

Other objects and advantages of the present invention will appear herein below.

SUMMARY OF THE INVENTION

In accordance with the invention, the foregoing objects and advantages have been readily attained.

In accordance with the invention, a method is provided for monitoring an industrial process, comprising the steps of: providing a knowledge base comprising a two-dimensional representation of operational conditions for said process; obtaining process real time data from said industrial process for a plurality of process variables; selecting relevant features from said real time data; obtaining an operational condition classification from said relevant features; transforming said operational condition classification into a two-dimensional point; and displaying said point on said knowledge base.

In further accordance with the present invention, a system is provided for monitoring an industrial process having at least two process variables, which system comprises a sensor member for obtaining real time data for said process variables; a processor unit for receiving said real time data, extracting relevant features from said real time data, obtaining an operational condition classification from said relevant features, and generating a two-dimensional point corresponding to said operational condition classification; and a knowledge-base having a two-dimensional representation of process operational conditions and being associated with said processor unit to display said point on said representation.

BRIEF DESCRIPTION OF THE DRAWINGS

A detailed description of preferred embodiments of the present invention follows, with reference to the attached FIG. 1 which schematically illustrates the system and method of the present invention.

DETAILED DESCRIPTION

The invention relates to a system and method for controlling industrial processes and, more particularly, to a system and method for monitoring, controlling and optimizing an industrial process having a multitude of variables by transforming the multitude of variables to a bi-dimensional or bi-variable state in order to construct process trajectories.

The system and method of the present invention are applicable to a wide variety of industrial processes. One particular example wherein the system and method of the present invention are particularly advantageous is the oil and gas industry, for example in monitoring a number of hydrocarbon producing wells from one or more fields or reservoirs so as to control, monitor and optimize production from each well.

In accordance with the invention, real time values of various process variables are obtained from the process or processes being controlled. This is carried out using conventional equipment which would be readily familiar to the person of ordinary skill in the art. Typical process variables within the oil and gas production industry include pressures, temperatures, fluid levels and loads, fluid composition, dynagraph relationships and the like. It is the handling of this potentially vast amount of information which forms the basis of the present invention.

In accordance with the present invention, a system is provided for receiving the real time values of information obtained from the aforesaid sensors, and this system transforms the information into a two-dimensional point or process current state which can readily be displayed on a knowledge base preferably containing a representation of various process conditions.

The system of the present invention preferably includes databases for receiving and storing real time data such as values of the process variables over time, for storing two-dimensional points and trajectories of these points, and a processor adapted to carry out the mathematical and knowledge-based related functions of the present invention.

The processor in accordance with the present invention is also advantageously programmed to generate trajectories of the process behavior from each point obtained. This might be, for example, oil production for each well being monitored and controlled. The mathematical model of the processor is also preferably adapted to generate a process behavior model from the data gathered in the variables database and the trajectories of the process stored in the trajectories database. With the model and process trajectories database, the predictive and knowledge-based model of the present invention is adapted and programmed to determine a current process trajectory using current real time values of the variables, and may suitably be adapted and programmed to predict a future expected state of the process using the behavior model and the current process trajectory.

The current process trajectory and predicted future expected states can then advantageously be comparatively monitored so as to detect a deviation of the current process trajectory from the various future expected states, and any deviation can advantageously be brought to the attention of an operator, for example through issuance of an advisory signal.

This allows for a large number of processes, each involving a potentially very large number of variables, to be monitored, controlled and optimized with a minimal level of human supervision, and further allows the human operator to focus only on situations where a deviation from the expected trajectory, or "orbit out", has been detected.

The process starts with data acquisition wherein real time data or values for a multitude of variables are obtained over time. A database or historical registry of these values is constructed, and this database is updated with newly acquired data, preferably continuously. Critical data or features are then extracted from the data so acquired. These features are then used to obtain a classification of operational conditions, and this classification is then fused or otherwise transformed into a two-dimensional point (x, y), which corresponds to a process condition, for example, production over time, operational process conditions, etc. A current trajectory for the process is then generated using the current state or point, real time data values and historical registry or database, and this trajectory is then stored in a trajectories database. The two-dimensional point is displayed or drawn on the knowledge base, which is a Cartesian plot, wherein a map of regions corresponding to a logical arrangement of different process conditions is displayed. The points over time form a trajectory which can then advantageously be analyzed in order to detect potentially abnormal situations and also in order to determine expected new status of the process.

The critical data to be extracted from the total variable data collected is preferably determined in advance, for example through principal component analysis, to identify and discard non-relevant features. The remaining relevant features then serve as input to a processor which preferably includes a diagnostic neural network. The diagnostic neural network then classifies these features as various operational conditions to be monitored, along with degrees of certainty for each condition indicative of whether such a condition is present. The process condition classification is then preferably input to a projection neural network which determines a two-dimensional point on the knowledge base which corresponds to the classification. This point can then be displayed on the knowledge base to be viewed by an operator monitoring the process. Related conditions are advantageously positioned on the knowledge base in a logical arrangement on the display to further facilitate monitoring of same, by allowing movement of the displayed state to be indicative of the type of change in the process. For example, a region indicating problems with a pump component would preferably be positioned in close proximity to a region indicating pump failure such that successive points on the knowledge base would travel toward the pump failure region as the problem became more serious.

Of course, the knowledge base for a particular process would be assembled based upon process familiarity and know-how, and could be different for each process.

The variables of a typical process to be controlled by the system and method of the present invention may include process conditions such as pertinent pressures, temperatures and fluid volumes, failure conditions such as unexpectedly high or low load on pumping equipment and the like, economic factors such as the current price of electricity and value of fluids being produced and the like, and production scheduling rates. Of course, depending upon the process, numerous other variables will be relevant. In accordance with the invention, values of each of these variables are stored in the variables database for use as needed.

As new variable values are gathered into the database, the system of the present invention generates new bi-dimensional points and joins these points to the current process trajectory. The system of the present invention then further can be used to determine a behavior model for the process being monitored.

With the trajectories and behavior model in hand, a knowledge-based model or process of the system of the present invention is then adapted to determine a real time current state of the process from the relevant real time variables obtained by the system from the process, and also to predict a future expected state, and preferably a series of future expected states, for the process.

The current point of the process trajectory, in combination with the entire trajectory and the future expected states of the process over time are then analyzed by the system of the present invention and any deviation in actual process conditions will be detected by the system. Any deviation is then advantageously brought to the attention of an operator, for example through issuance of an advisory signal, so that the operator can investigate and react to the deviation.

According to the invention, once a deviation is detected, it may be preferred to program the mathematical and knowledge-based models to analyze each known trajectory with the current trajectory to determine the type of deviations and their possible causes, and to include this information in the advisory signal.

The predicted future states are also advantageous information in that the predicted future states themselves can be monitored for early indications of process faults such as pump over or under utilization, excessive gas or water production, and the like, and corrective action can be taken in advance of the actual occurrence of a fault.

Referring to the drawing, FIG. 1 shows a schematic representation of the system and method of the present invention. As shown, a series of process variables ($V_1$, $V_2$ . . . $V_n$) are monitored for real time values X as shown in step 10. The variables to be monitored, as shown in the drawing, may typically include pressure, temperature, fluid level and fluid load, among many others. Real time values X are fed to the processor 12 of the present invention wherein relevant features (f1,f2, . . . fn), are extracted as shown in step 14, and also are stored in variables database 16. This is referred to hereinafter as function F1 and is carried out using known techniques such as principal component analysis and the like.

Step 18 in the drawing illustrates input of the relevant features from step 14 to a diagnostic neural network which is trained to correlate relevant features as input with an operational condition classification as output (referred to hereinafter as function F2). This classification is preferably a series of identifiers corresponding to various possible conditions (C1, C2, . . . , Cn) and a corresponding certainty as to the likelihood that such condition is occurring. Thus, the diagnostic neural network gives a determined weight to each operational condition in real time. In the drawing, two typical conditions are shown with certainties, specifically, a low load condition with a 30% likelihood, and a plain sand condition with a 50% likelihood. This information is transferred to a projection neural network as shown in the drawing at step 22, and transformed by the network into coordinates of a point P on a knowledge base 24 corresponding to the condition classification (referred to hereinafter as function F3). This point P, when plotted or displayed on the knowledge base 24 or Cartesian map, shows the specific process deviation or diagnosis. Thus, in accordance with the present invention, the equation W=F3(F2(F1(X))) describes the procedure of the graphic representation or construction of points P, which allows the operator to quickly detect abnormal situations. Vector (X) includes all values of process variables which are processed through the composition of three functions, which are, features extraction (F1), operational conditions classification (F2) and dimensionality reduction or graphic viewer generation (F3). The function composition output is a point (x,y) represented in the two-dimensional space or knowledge base 24 as discussed above.

It should be readily apparent that the system and method of the present invention solve existing problems in the industry of process optimization, determination of process current status and prediction of future status, and the handling of large volumes of data and informational hierarchies in a user-friendly manner.

In further accordance with the invention, the processor or processors on which the mathematical and knowledge-based models are configured may include a neural network and principal component analysis (PCA) capability for extracting critical data and carrying out the dimensionality reduction from the variables and may include Kohonen and other clustering maps for transforming the critical data into orthogonal, independent variables.

Further, the system and method of the present invention, by continuously storing trajectories of the process, develops an expert trajectories database 26 which can be used to feed the mathematical and knowledge-based models of the system of the present invention with increasingly accurate predictions of future behavior.

The system and method of the present invention further advantageously identify and use relevant feature values as compared to using all process variable values, thereby utilizing a smaller number of values eventually transformed into a two-dimensional point P. The two-variable point P position over the knowledge base 24 or Cartesian map is updated to show the process trajectory and shows current operational state, thereby allowing an operator to detect an abnormal situation earlier and faster.

It should therefore be appreciated that the system and method of the present invention readily provide for enhancements in monitoring, controlling and optimization of industrial processes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for monitoring an industrial process, comprising the steps of:
   obtaining process real time data from said industrial process for a plurality of process variables;
   selecting relevant features from said real time data;
   providing a diagnosis neural network trained to correlate relevant features with operation condition classifications;
   inputting said relevant features to said diagnosis neural network to obtain said operational condition classification comprising a plurality of process conditions and a corresponding certainty factor for each of said process conditions;
   providing a projection neural network trained to correlate said process conditions and said certainty factor with a knowledge base;
   inputting said process conditions and said certainty factor to said projection neural network to obtain a two dimensional process trajectory data point; and
   displaying said point on the knowledge base comprising a two-dimensional process trajectory representation of operational conditions for said process.

2. The method according to claim 1, further comprising the steps of generating a current process trajectory for said point and storing said current process trajectory in a trajectories database.

3. The method according to claim 2, further comprising the step of predicting a future operational condition of said process from said trajectories database and said current process trajectory.

4. The method according to claim 3, further comprising the step of providing a knowledge-based model based on said trajectories database, and utilizing said knowledge-based model and said current process trajectory to predict said future operational condition.

5. The method according to claim 1, wherein said knowledge base is a two-dimensional representation of process conditions arranged on a Cartesian plot, and said point is a set of coordinates on said plot.

6. The method according to claim 1, further comprising the step of storing said real time data in a variables database.

7. The method according to claim 1, further comprising the step of taking corrective action corresponding to an operational condition displayed on said knowledge-base so as to optimize said process.

8. The method according to claim 1, wherein said industrial process is a process for production of hydrocarbons.

9. The method according to claim 1, further comprising monitoring a plurality of industrial processes, wherein said operational condition classification includes normal operation and fault operation, and further comprising generating an advisory signal for an industrial process experiencing a fault operation.

10. The method of claim 1, wherein said operational conditions include related operational conditions, and wherein said related operational conditions are positioned substantially adjacent to each other on said knowledge base.

11. A system for monitoring an industrial process, comprising:
   a sensor member for obtaining process real time data from said industrial process for a plurality of process variables;
   a processor unit for receiving said real time data and for selecting relevant features from said real time data;
   a diagnosis neural network trained to correlate said relevant features with operation condition classifications to obtain said operational condition classification comprising a plurality of process conditions and a corresponding certainty factor for each of said process conditions;
   a projection neural network trained to correlate said process conditions and said certainty factor with a knowledge base to obtain a two-dimensional process trajectory data point;

said knowledge base comprising a two-dimensional process trajectory representation of operational conditions for said process and being associated with said processor unit for displaying said point of said knowledge base.

12. The system according to claim 11, wherein said processor unit transforms said two-dimensional point into a current process trajectory, and further comprising a trajectories database for storing said current process trajectory.

13. The system according to claim 11, wherein said processor unit further includes a knowledge-based model based on said trajectories database and adapted to predict a future operational condition.

14. The system according to claim 11, wherein said process operational conditions include related operational conditions, and wherein said related operational conditions are positioned substantially adjacent to each other on said knowledge base.

* * * * *